Jan. 9, 1945.  P. GILLI  2,367,114
FIRELESS LOCOMOTIVE WITH HIGH ACCUMULATOR PRESSURE
Filed July 6, 1940

Inventor
PAUL GILLI
By [signature]
Attorney.

Patented Jan. 9, 1945

2,367,114

UNITED STATES PATENT OFFICE 2,367,114

FIRELESS LOCOMOTIVE WITH HIGH ACCUMULATOR PRESSURE

Paul Gilli, Vienna, Germany; vested in the Alien Property Custodian

Application July 6, 1940, Serial No. 344,286
In Germany June 26, 1939

5 Claims. (Cl. 122—35)

The invention relates to fireless locomotives with high accumulator pressure, in which an equalizing chamber is connected between the accumulator vessel, and the steam cylinders, usually on the low pressure side of the throttle valve, particularly has for its object the arrangement of the equalization container between the superheater and the steam cylinders in such a manner that the heat loss from the equilzation container is low. Another object is to arrange the parts so that heat is supplied from the accumulator container to the equalization container so that the steam in the equalization container cannot condense.

This is attained according to the invention by arranging the equalization container inside the insulation and sheathing of the accumulator. The equalization container may be arranged in or outside the accumulator itself.

By this arrangement the walls of the equalization container are heated at all times, including during long standstill periods, to approximately the temperature of the accumulator and for this reason the low pressure steam contained in the equalization container cannot condense, so that water-hammer in the cylinders is avoided and besides a compact construction of the locomotive is attained.

Several examples for the arrangement of the equalization container according to the invention are illustrated in the accompanying drawing by way of example.

Figure 1:
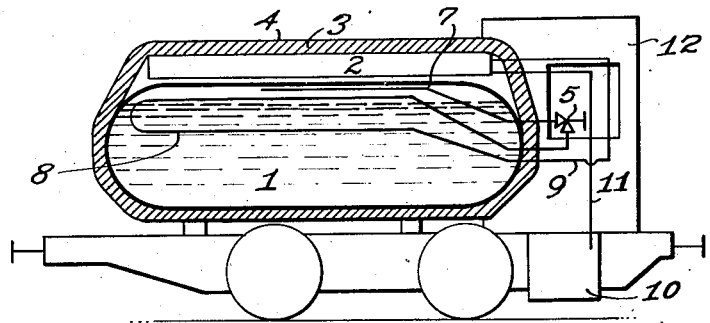
Fig. 1 shows the equalization container arranged above the accumulator.

Fig. 1 shows a form of construction of the invention in which the equalization container 2 is in the form of a tube of comparatively short diameter and of approximately the same length as the accumulator 1, said tube being arranged above the accumulator and parallel to the same. The accumulator and the equalization container are enclosed by common heat insulation 3 and the sheathing 4. The steam flows from the steam space of the accumulator through a conduit 7 to a throttle valve 5 and thence to a superheater 8 located within the accumulator. From the superheater the steam passes through the conduit 9 to the container 2, which is connected with the cylinder 10 by means of a conduit 11. The equalization container may be arranged with the same advantageous result below or obliquely below the accumulator.

Figure 2:
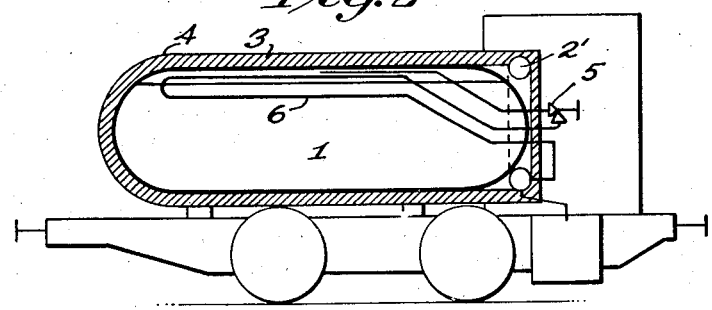
Fig. 2 shows the equalization container at the front end of the accumulator.

Fig. 2 shows another arrangement or construction of the equalization container according to the invention. 1 is the accumulator from which the steam can be taken and conducted through the throttle valve 5 and the superheater 6 to the equalization container 2'. This equalization container 2' is constructed as a ring-shaped tube to utilize the space between the insulation 3 and the accumulating container 1. With the same effect the equalization container may be constructed as part of a ring or an arcuate tube.

The equalization container is preferably mounted according to the invention at that end of the locomotive on which the steam cylinders 10 or the cab 12 are mounted.

Figure 3:
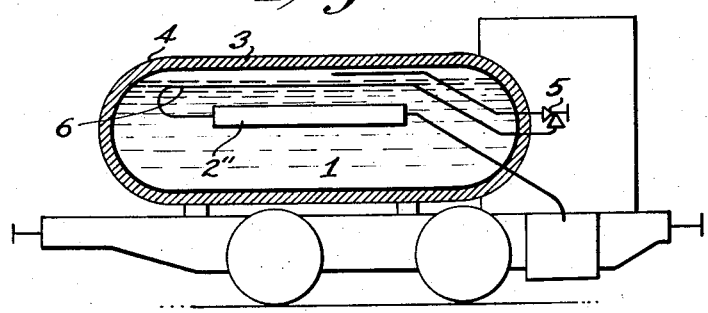
Fig. 3 shows the equalization container arranged inside the accumulator.

Fig. 3 shows a form of construction in which the equalization container 2" is formed as a continuation of the superheater 6 and is arranged inside the accumulator 1. This arrangement is especially simple, but presents the inconvenience that the water content of the accumulator is reduced owing to the space occupied by the equalization container, so that the capacity of the accumulator locomotive is reduced. This capacity loss becomes greater with rising accumulator pressure, so that the arrangement of the equalization container in the accumulator is much better at lower accumulator pressures than when the accumulator pressures are high.

The equalization container can be arranged in the accumulator so that the whole superheater or a portion of the same is carried out with considerably enlarged cross-sectional area, in which case the large superheater volume acts as an equalization container. In order to obtain an effective equalization, the equalization volume, that is in the present instance the superheater volume, must be at least equal to double the stroke volume of the steam cylinders.

I claim:

1. A steam accumulator comprising a cylindrical vessel adapted to withstand high pressures, an equalizing vessel on the exterior of said cylindrical accumulator vessel and in heat exchange relationship with respect thereto, heat insulating means forming a shell surrounding said vessels, a pipe connected with the steam space of said cylindrical accumulator vessel, a superheater connected to receive low-pressure steam from said pipe and positioned within said cylindrical accumulator vessel, a throttle valve controlling the flow from said cylindrical accumulator vessel to said superheater, and a pipe connecting said superheater to deliver superheated steam to said equalizing vessel.

2. A steam accumulator as described in claim 1 wherein said equalizing vessel is in the form of a cylinder positioned parallel to said cylindrical accumulator vessel along the top thereof.

3. A steam accumulator as described in claim 1 wherein said equalizing vessel is positioned at one end of said cylindrical accumulator vessel.

4. A steam accumulator as described in claim 1 wherein said equalizing vessel is in the form of a ring tube positioned at one end of the cylindrical accumulator vessel with the axis of the ring coincident with the axis of the cylindrical accumulator vessel.

5. A steam accumulator comprising a cylindrical accumulator vessel having rounded end walls and adapted to withstand high pressures, an equalizing vessel on the exterior of said accumulator vessel and in heat exchange relationship with respect thereto, heat insulating means forming a shell surrounding said vessels, a pipe extending from the upper portion of said cylindrical accumulator vessel through an end wall thereof, a throttle valve mounted upon said end wall of said cylindrical accumulator vessel and connected to control the flow from said accumulator vessel through said pipe, a superheater connected to receive low-pressure steam from said throttle valve and positioned within said accumulator vessel, and a pipe connecting said superheater to deliver superheated steam to said equalizing vessel.

PAUL GILLI.